United States Patent [19]
Walker

[11] Patent Number: 5,710,107
[45] Date of Patent: *Jan. 20, 1998

[54] ENVIRONMENTALLY SAFE DRILLING FLUID

[75] Inventor: Thad O. Walker, Kingwood, Tex.

[73] Assignee: O'Brien-Goins-Simpson & Associates, Houston, Tex.

[*] Notice: The term of this patent shall not extend beyond the expiration date of Pat. No. 5,403,820.

[21] Appl. No.: 492,075

[22] PCT Filed: Nov. 9, 1993

[86] PCT No.: PCT/US93/10809

§ 371 Date: Jun. 12, 1995

§ 102(e) Date: Jun. 12, 1995

[87] PCT Pub. No.: WO94/14919

PCT Pub. Date: Jul. 7, 1994

[51] Int. Cl.$^6$ .................................. C09K 7/00
[52] U.S. Cl. ........................... 507/110; 507/925
[58] Field of Search ..................... 507/211, 110, 507/115, 209, 925

[56] References Cited

U.S. PATENT DOCUMENTS

| | | | |
|---|---|---|---|
| 3,936,300 | 2/1976 | Cardone | 430/219 |
| 4,528,106 | 7/1985 | Grolitzer | 507/209 |
| 4,687,843 | 8/1987 | Smolin et al. | 507/110 |
| 5,403,820 | 4/1995 | Walker | 507/110 |
| 5,479,987 | 1/1996 | Hale | 166/293 |
| 5,494,120 | 2/1996 | Hale et al. | 507/110 |
| 5,602,082 | 2/1997 | Hale et al. | 507/115 |

*Primary Examiner*—Sharon Gibson
*Assistant Examiner*—Valerie Fee
*Attorney, Agent, or Firm*—Roy F. House

[57] ABSTRACT

The invention provides for either (a) increasing the yield point or gel strength of an aqueous based drilling fluid; (b) decreasing the fluid loss of an aqueous based drilling fluid; (c) decreasing the coefficient of friction of an aqueous based drilling fluid; or (d) decreasing the aqueous activity of an aqueous based fluid drilling fluid thus decreasing the swelling of shales contacted by an aqueous based fluid, the methods comprises adding to the drilling fluid an amount of an alkyl glycoside, preferably methyl glucoside, sufficient to effect such increase or decrease. The invention also provide for aqueous based completion fluids, workover fluids, and well working fluids containing an alkyl glucoside solubilized in the aqueous phase of said fluids.

26 Claims, No Drawings

ENVIRONMENTALLY SAFE DRILLING FLUID

This application is a 371 of PCT/US93/1089 filed Nov. 9, 1993.

FIELD OF THE INVENTION

The invention relates to drilling, workover, completion, and well servicing fluids and methods to improve the same.

BACKGROUND OF THE INVENTION

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, and then back up said bore hole to the surface by passage through the annular space between said drill stem and the wall of said bore hole (or between said drill stem and the wall of the casing where casing has been put in place).

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as a weighting material exerting sufficient pressure to counterbalance any pressure exerted by water, gas, oil, or other fluid from a penetrated formation and to prevent caving or other intrusion into the drill hole. The drilling fluid must also serve as a lubricant for the bearings of the drill bit and the cutting surface of the bit teeth, and to reduce frictional forces on the drill pipe.

The science and technology of drilling fluids and methods of drilling, working over, completing, and servicing oil and/or gas wells has been extensively investigated for over sixty years. Materials and methods are known to increase the yield point or gel strength, to decrease the fluid loss, and to decrease the coefficient of friction of aqueous base drilling fluids, and to decrease the swelling of shales contacted by the drilling fluids.

While the systems developed thus far show improvement over the older aqueous base fluids, they are sometimes inadequate when difficult shale formations are encountered. Operators are, therefore, forced to revert to hydrocarbon-containing fluids. It is desirable to provide biodegradable additives for aqueous base fluids that would minimize or completely avoid the need for oil base systems when drilling problem shale formations.

SUMMARY OF THE INVENTION

The present invention is based on the discovery that a biodegradable water soluble alkyl glycoside, when added to an aqueous base drilling fluid, will increase the yield point and/or gel strength of the drilling fluid, decrease the fluid loss of the drilling fluid, decrease the coefficient of friction of the drilling fluid, and/or decrease the aqueous activity and thus the swelling of shales contacted by the drilling fluid, depending upon the concentration of the alkyl glycoside incorporated into the fluid.

Thus it is an object of this invention to provide a method of (a) increasing the yield point or gel strength of an aqueous base drilling fluid, (b) decreasing the fluid loss of an aqueous base drilling fluid, (c) decreasing the coefficient of friction of all aqueous base drilling fluid, (d) and/or decreasing the aqueous activity of an aqueous base drilling fluid and thus decreasing the swelling of shales contacted by an aqueous base drilling fluid, which comprises adding to the fluid an amount of alkyl glycoside sufficient to effect such increase or decrease.

It is another object of this invention to provide aqueous based fluids containing a water soluble alkyl glycoside in an amount which is sufficient to either (a) increase the yield point or gel strength of the fluid, (b) decrease the fluid loss of the fluid, (c) decrease the coefficient of friction of the fluid, and/or (d) decrease the aqueous activity of the fluid and thereby decrease the swelling of shales contacted by the fluid.

In its broadest aspect, the invention provides a fluid selected from the group consisting of drilling fluids, completion fluids, workover fluids, and well working fluids having incorporated therein all alkyl glycoside as hereinafter defined.

These and other objects of the invention will be readily apparent to one skilled in the art as the description thereof proceeds.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENTS OF THE INVENTION

The drilling fluid of the present invention contains an aqueous phase which may be either fresh water, a brine, sea water, or any combination thereof. The brine, if used, may be a naturally occurring brine or a manufactured brine obtained by the dissolution of one or more water soluble salts in water, a brine, sea water, or mixtures thereof. Suitable water soluble salts include sodium chloride, potassium chloride, calcium chloride, sodium acetate, potassium acetate, calcium acetate, potassium formate, and the like, and mixtures thereof.

The term glycoside is applied to a type of compound in which a sugar (reducing saccharide) is combined through its reducing group with al, organic substance containing an alcoholic hydroxyl group, such as phenol or an alcohol. Many of the known glycosides occur naturally in plants and animals and were originally isolated from such sources. Some of these naturally occurring glycosides are the familiar and exotic sounding coniferin, salicin, amygdalin, arbutin, hesperidin, quercitrin, indican, delphinin, and chrysanthemin. The sugar portion of most naturally occurring glycosides is glucose and, accordingly, these glycosides are known specifically as glucosides. (Similarly, if the sugar portion is galactose the glycosides are specifically designed as galactosides). When the nonsugar part of a glycoside (called aglycon) is a phenol or alcohol, the compound is known, respectively, as an aryl glycoside or an alkyl glycoside. Thus, the combination of phenol with glucose results in the aryl glucoside known as phenyl glucoside. It also follows that the glycoside arising from the combination of methanol and glucose is the alkyl glycoside, methyl glucoside. Reference may be made to the following books for more information on glycosides in general: M. L. Wolfrom and A. Thompson, H. Baumann and W. Pigman, in "The Carbohydrates" (W. Pigmall, ed.), Chapters IV and X, Academic Press, New York, 1957; E. F. Armstrong and K. F. Armstrong, "The Glycosides," Longmans, Green, New York, 1931. Information oil methyl glucoside, specifically, can be found in the following book: G. N. Bollenback, "Methyl Glucoside," Academic Press, New York, 1958.

Structurally speaking, a glycoside is the compound resulting from the exchange of an organic radical (aryl, alkyl, etc.) for the hydrogen of the hemiacetal hydroxyl group (that attached to carbon (1) in formula I of a cyclic form of a reducing sugar.

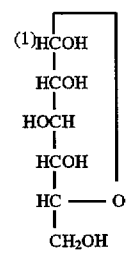

I

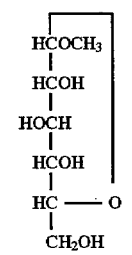

II

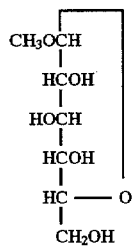

III

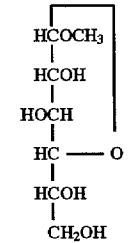

IV

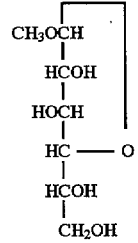

V

I = D-glucose
II = Methyl α-D-glucopyranoside
III = Methyl β-D-glucopyranoside
IV = Methyl α-D-glucofuranoside
V = Methyl β-D-glucofuranoside An alkyl glucoside such as a methyl glucoside can exist in several isometric forms. The carbon atom containing the organic radical (carbon (1)) is asymmetric and the ring structure may shift from 6-membered to 5-membered (pyranose and furanose). Thus, there are at least four different isomers of every glycoside, which are called α- and β-pyranosides (formulas II and III) and α- and β-furanosides (formulas IV and V). For the purposes of this invention, the term alkyl glycoside (or alkyl D-glycoside) is used generically to include all isomeric forms of the alkyl glycoside. The terms alkyl α-D-glycoside and alkyl β-D-glycoside are used when referring to glycosides having the specific α- or β-rotation of the alkyl group. Thus methyl α-D-glycoside includes the isomers methyl α-D-pyranoside and methyl β-furanoside, and methyl β-D-glucoside includes the isomers methyl β-D-pyranoside and methyl β-D-furanoside.

The alkyl glycosides for the purpose of this invention are water soluble. Thus the alkyl radical may contain from one to four carbon atoms, i.e., the alkyl radical may be selected from the group consisting of methyl, ethyl, n-propyl, iso-propyl, n-butyl, iso-butyl, sec-butyl, t-butyl, and mixtures thereof. The preferred alkyl radical is methyl or ethyl, most preferably methyl. Thus the preferred glycosides are methyl glucoside and ethyl glucoside, most preferably methyl glucoside.

An alkyl glycoside as used herein is defined as a material which contains from 1 to 5 units of a sugar source, such as glucose, and an alkyl radical, or substituted alkyl radical, containing 1 to 4 carbon atoms. If the glycoside contains 2 or more units of glucose, e.g., a polymer, then the material may be referred to as a polyglucoside. If the glycoside contains 2 units of glucose, then the material may be referred to as a glucoside or a-polyglucoside having a degree of polymerization (D.P.) of 2. The D.P. value is normally stated as an average insofar as a mixture of glycosides having different degrees of polymerization will normally be obtained. Preferably the D.P. of the glycosides herein is from 1.0 to about 5, more preferably from 1.0 to 3.0. The term glycoside also embraces ether derivatives of glycosides such as the methyl, ethylene oxide and propylene oxide adducts, provided the number of moles of methyl chloride, ethylene oxide and/or propylene oxide reacted per mole of the reducing sugar monomer does not render the glycoside water insoluble. Thus the alkyl glucoside will have the empirical formula

$C_6OH_7(OZ)_4[OC_6OH_7(OZ)_3]_nOR$ where n=0–4, R=$C_1$–$C_4$ alkyl, and where each Z is independently selected from the group consisting of H, $CH_3$, $(CH_2CH_2O)_aH$, and $[CH_2CH(CH_3)O]_bH$, a=1–20, b=1–15.

Methods are known for the preparation of the alkyl glycoside. See for example the following U.S. Patents, incorporated herein by reference: U.S. Pat. Nos. 2,276,621; 2,390,507; 2,606,186; 3,296,245: 3,375,243.

I have found that the addition of a water soluble alkyl glycoside, preferably methyl glucoside, to an aqueous base drilling fluid in an amount of about: (1) 3% by weight; or more will increase the yield point or gel strength of the drilling fluid; (2) 5% by weight or more will decrease the fluid loss of the drilling fluid; (3) 15% by weight or more will decrease the coefficient of friction of the drilling fluid; and (4) 35% by weight more of the liquid phase of the drilling fluid will decrease the aqueous activity of the drilling fluid and thus decrease the swelling of shale contacted by the drilling fluid.

As is well known, an increase in the yield point of a drilling fluid will increase the cuttings carrying capacity of the drilling fluid, all other variables affecting the cuttings carrying capacity being unchanged. Likewise, an increase in the gel strength of a drilling fluid will increase the capacity of the drilling fluid to maintain the cuttings in suspension when the drilling fluid is not being circulated. Thus it is often desirable to increase the yield point or gel strength of the drilling fluid.

I have found that the addition of a biodegradable water soluble alkyl glycoside in an amount of about 3% or more by weight of the drilling fluid, preferably at least about 8% by weight, will increase the yield point and/or gel strength of the drilling fluid.

Also as is well known it is good engineering practice to minimize the loss of fluid to the formation being drilled. Thus one or more additives may be added to a drilling fluid to decrease the fluid loss of the drilling fluid. I have found that the addition of the water soluble alkyl glycoside in an amount of 5% by weight or more of the drilling fluid, preferably at least about 10% by weight, will decrease the API fluid loss the drilling fluid.

It is known to add various materials to aqueous base drilling fluids to increase the lubricity of the drilling fluid. The addition of about 15% by weight of the drilling fluid, or more, of the water soluble alkyl glycoside will lower the coefficient of friction of the drilling fluid appreciably, hence increasing the lubricity of the drilling fluid.

It is particularly preferred to add sufficient water soluble alkyl glycoside to the drilling fluid to decrease the aqueous activity of the drilling fluid and thus decrease the swelling and/or dispersion of shales contacted by the drilling fluid.

It is well known that the aqueous activity of the aqueous phase of an invert water-in-oil emulsion drilling fluid can be decreased by dissolving a water soluble salt therein. Thus the aqueous activity of the oil base mud can be adjusted such that no water will transfer, by osmosis, to shale formations contacted by the drilling fluid. Indeed, the aqueous activity can be adjusted to draw water out of the shale formations and into the invert emulsion mud. Shale swelling occurs when water is imbibed by the shale.

While the aqueous activity of aqueous (water) base muds may be decreased by dissolving water soluble salts and polar organic compounds therein, in the absence of a semipermeable membrane enveloping the shale, water will transfer to a swelling shale contacted by the mud and swelling of the shale will occur.

I have surprisingly found that the activity of an aqueous base fluid can be decreased significantly by the addition thereto of a water soluble alkyl glycoside, and that the swelling of shales contacted by the fluid is decreased. Indeed I have found, at very high concentrations of the alkyl glycoside in the aqueous drilling fluid, that water can be removed from a swelling shale. The mechanism, by which the alkyl glycoside is able to accomplish such results is not known at the present time.

The liquid phase of the drilling fluid will preferably contain at least about 35% by weight alkyl glycoside solubilized therein, preferably from about 35% to about 65%, and most preferably from about 45% to about 60%. The term "liquid phase" when used in this specification and the claims is defined an the combined water and the soluble materials, such as salts, bases, and the alkyl glycoside, dissolved therein.

The concentration of the alkyl glycoside required to decrease the aqueous activity of the drilling fluid and thus decrease the swelling of shales contacted by the fluid may be decreased by adding to the aqueous base fluid water soluble salts. The combination of a water soluble salt and the water soluble alkyl glycoside synergistically reduces the activity of the aqueous base fluid.

Indeed the liquid phase of the drilling fluid can be used as the internal phase of a water-in-oil invert emulsion drilling fluid. Thus the aqueous activity of the aqueous phase of an invert emulsion drilling fluid can be decreased by incorporating an alkyl glycoside, preferably methyl glucoside, therein.

The drilling fluids of this invention, in addition to the aqueous phase, will contain other materials known in the drilling fluid art to provide aqueous base drilling fluids with certain desired characteristics. Thus the drilling fluid may contain weighting agents, viscosifiers, fluid loss reducing additives, rheological modifying additives (so-called "thinners"), emulsifiers, seepage loss control additives, lubricity additives, defoamers, pH control additives, and the like, including materials known to inhibit shale cuttings hydration and/or dispersion, all of such materials being solubilized, suspended, or dispersed in the drilling fluid.

The preferred drilling fluids of this invention will contain a basic material to impart a pH of at least about 8.5 to the drilling fluid, preferably a pH from about 9 to about 12. The basic material is preferably sodium hydroxide or potassium hydroxide, most preferably potassium hydroxide. Other bases such as calcium oxide, calcium hydroxide, magnesium oxide, sodium carbonate, and the like may be used in a properly formulated drilling fluid.

The drilling fluids of this invention containing an alkyl glycoside have enhanced thermal stability as compared to drilling fluids containing the unmodified sugar, i.e., glucose, galactose, sucrose, and the like.

As is well known in the art, the drilling fluid is circulated within the borehole while drilling. When the temperature of the subterranean formations contacted by the borehole is greater than the ambient surface temperature, the drilling fluid temperature will increase accordingly. As the temperature increases, reactions within the drilling fluid may occur, depending upon its composition, which decreases the pH of the drilling fluid. Thus periodic additions of a base are required to maintain the desired pH.

In a preferred embodiment of this invention, there is provided an aqueous solution of the alkyl glucoside and the base for addition of the drilling fluid. Thus, I have found that pre-reacting an alkali metal hydroxide and an aqueous solution of the alkyl glucoside provides a liquid additive for use in the preparation and maintenance of drilling fluids which requires that less total alkali metal hydroxide be added to the drilling fluid to maintain the desired pH. The aqueous solution comprises from about 50% to about 85% by weight alkyl glucoside and at least about 2% by weight alkali metal hydroxide. Preferably the aqueous solution comprises from about 55% to about 80% alkyl glucoside and from about 2.5% to about 10% by weight alkali metal hydroxide, most preferably from about 60% to about 80% by weight alkyl glucoside and from about 2.5% to about 5% alkali metal hydroxide.

In order to more completely describe the invention, the following non-limiting examples are given. In these examples and throughout this specification, the following abbreviations may be used: API=American Petroleum Institute; cp=centipoise: °C.=degrees Centigrade; °F.=degrees Fahrenheit; %=percent; cc=cubic centimeters;

cm=centimeter; l=liter; sec=seconds; ft=feet; min=minute; psi=pounds per square inch; kg/m³=kilograms per cubic meter; mg/l-milligrams per liter; g=grams; lb/100 ft²= pounds per 100 square feet; lb/bbl or ppb=pounds per 42 gallon barrel; min.=minute; YP=yield point; PV=plastic viscosity; MG=methyl glucoside. Unless otherwise indicated the methyl glucoside used in the examples contained from about 45% to about 55% by weight of methyl α-D-glucoside and from about 45% to about 55% by weight of methyl β-D-glucoside. About 94% by weight of the methyl glucoside are the methyl glucopyranoside isomers and about 6% by weight are the methyl glycofuranoside isomers. All drilling fluid data were obtained utilizing the procedures set forth in API Specification RP13B unless otherwise indicated.

EXAMPLE 1

A methyl glucoside solution was prepared which contained 70% by weight methyl glucoside and 3.3% by weight potassium hydroxide. Drilling fluids were prepared in fresh water containing 12.5 ppb (35.7 kg/m³) API grade bentonite clay, 0.5 ppb (1.43 kg/m³) potassium hydroxide, and sufficient of the methyl glucoside solution to provide the methyl glucoside concentration set forth in Table 1. These drilling fluids were hot-rolled for 4 hours at 150° F. (65.5° C.). The viscosity at 160° F. (71.1° C.) was then obtained. The data obtained are given in Table 1.

TABLE 1

Laboratory Formulation Of Bentonite Muds Containing Methyl Glucoside
Base Mud: 12.5 ppb Prehydrated API Grade Bentonite and 0.5 ppb KOH in Fresh Water. Muds hot rolled at 150° F. for 4 hours.

| Rheology @ 160° F. | % by Weight Methyl Glucoside | | | | |
|---|---|---|---|---|---|
| | 0 | 3.25 | 6.5 | 13.0 | 19.5 |
| RPM Readings | | | | | |
| 600 | 6 | 10 | 12 | 39 | 53 |
| 300 | 3 | 6 | 7 | 31 | 47 |
| 200 | 3 | 4 | 6 | 29 | 45 |
| 100 | 2 | 3 | 4 | 26 | 43 |
| 6 | 1 | 1 | 1 | 20 | 19 |
| 3 | 1 | 1 | 1 | 18 | 15 |
| Plastic Viscosity, cp | 3 | 4 | 5 | 8 | 6 |
| Yield Point, lb/100 sq. ft. | 0 | 2 | 2 | 23 | 41 |
| Initial Gel, lb/100 sq. ft. | 2 | 3 | 1 | 16 | 12 |
| 10 Minute Gel, lb/100 sq. ft. | 6 | 9 | 18 | 19 | 13 |
| YP/PV | 0 | 0.5 | 0.4 | 2.9 | 6.8 |

EXAMPLE 2

A methyl glucoside solution was prepared which contained 68% by weight methyl glucoside and 2.25% by weight potassium hydroxide. Drilling fluids were prepared in fresh water containing the amounts of this methyl glucoside solution, XCD xanthan gum, FLOPLEX crosslinked carboxymethyl starch, DEXTRID pre-gelatinized starch, and barite set forth in Table 2A. The drilling fluids were hot-rolled at 150° F. (65.5° C.) for 16 hours, cooled to room temperature, and the API fluid loss and the coefficient of friction obtained. The data are given in Table 2B.

TABLE 2A

Composition of the Drilling Fluids

| Sample No. | Fresh Water cc | MG Solution g | XCD g | FLOPLEX g | DEXTRID g | Barite g |
|---|---|---|---|---|---|---|
| 1 | 310.6 | 0 | 1 | 1 | 2.5 | 0 |
| 1A | 293.2 | 34 | 1 | 1 | 2.5 | 0 |
| 1B | 277.0 | 66 | 1 | 1 | 2.5 | 0 |
| 1C | 241.7 | 135 | 1 | 1 | 2.5 | 0 |
| 1D | 205.7 | 205 | 1 | 1 | 2.5 | 0 |
| 1E | 185.5 | 245 | 1 | 1 | 2.5 | 0 |
| 2 | 310.6 | 0 | 1 | 1 | 2.5 | 115 |
| 2A | 293.2 | 34 | 1 | 1 | 2.5 | 115 |
| 2B | 277.0 | 66 | 1 | 1 | 2.5 | 115 |
| 2C | 241.7 | 135 | 1 | 1 | 2.5 | 115 |
| 2D | 205.7 | 205 | 1 | 1 | 2.5 | 115 |
| 2E | 185.5 | 245 | 1 | 1 | 2.5 | 115 |

TABLE 2B

Effect of Methyl Glucoside (MG) on the API Filtrate and Coefficient of Friction

| Sample No. | % MG* | % MG** | API Filtrate cc | Coefficient of Friction |
|---|---|---|---|---|
| 1 | 0 | 0 | 27.0 | 0.20 |
| 1A | 7.07 | 7.0 | 11.0 | 0.20 |
| 1B | 13.0 | 12.8 | 9.4 | 0.18 |
| 1C | 24.2 | 24.0 | 9.0 | 0.09 |
| 1D | 33.9 | 33.5 | 7.0 | 0.04 |
| 1E | 38.5 | 38.2 | 6.2 | 0.03 |
| 2 | 0 | 0 | 5.0 | 0.17 |
| 2A | 7.07 | 5.2 | 5.0 | 0.16 |
| 2B | 13.0 | 9.6 | 4.0 | 0.15 |
| 2C | 24.2 | 18.4 | 2.7 | 0.10 |
| 2D | 33.9 | 26.2 | 1.6 | 0.05 |
| 2E | 38.5 | 30.15 | 0.5 | 0.08 |

*Based on the weight of the liquid phase of the drilling fluid
**Based on the weight of the drilling fluid

EXAMPLE 3

An aqueous methyl glucoside solution was prepared containing 70.0% by weight methyl glucoside and 2.7% weight potassium hydroxide. 2748 grams of this methyl glucoside solution were mixed with 737 grams of a prehydrated API grade bentonite slurry containing 8.13.% by weight bentonite for 30 minutes. Thereafter, 16 grams of DEXTRID® brand pregelatinized potato starch were added as a fluid loss control additive and the drilling fluid sample mixed an additional 60 minutes. Thus this drilling fluid contained 975.8 kg/m³ the methyl glucoside solution (683 kg/m³ of methyl glucoside, 26.3 kg/m³ potassium hydroxide), 21.3 kg/m³ bentonite, and 5.7 kg/m³ DEXTRID®. This drilling fluid sample was split into 350 cc aliquots, and to separate aliquot samples there were added either 28.6 kg/m³ sodium chloride or 14.3 kg/m³ gypsum. The samples were hot rolled at 150° F. for 16 hours and certain properties obtained as indicated in Table 3. The aqueous activities set forth in Table 3 were obtained with a Digital Thermo-llygrometer Model 880 (General Eastern) using the procedure in API RP 138-2.

A drilling fluid weighted to 1632.7 kg/m³ with API grade bentonite was prepared as above containing 583.8 kg/m³ methyl glucoside, 22.6 kg/m³ KOH, 18.3 kg/m³ API grade bentonite clay, 5.7 kg/m³ DEXTRID fluid loss control additive, and 586 kg/m³ barite. This base drilling fluid was treated and evaluated as indicated above. The data obtained are given in Table 3.

TABLE 3

|  | Unweighted Fluid | | | Weighted Fluid | | |
| --- | --- | --- | --- | --- | --- | --- |
|  | Base Fluid | Base Fluid + NaCl | Base Fluid + Gypsum | Base Fluid | Base Fluid + NaCl | Base Fluid + Gypsum |
| RPM Readings | | | | | | |
| 600 | 166 | 165 | 181 | 287 | 255 | 277 |
| 300 | 87 | 88 | 96 | 155 | 137 | 146 |
| 200 | 62 | 63 | 66 | 108 | 96 | 98 |
| 100 | 34 | 32 | 34 | 58 | 52 | 50 |
| 6 | 3 | 3 | 2 | 6 | 9 | 3 |
| 3 | 2 | 1 | 1 | 4 | 7 | 2 |
| Plastic Viscosity, cp | 79 | 77 | 85 | 132 | 118 | 131 |
| Yield Point, lb/100 ft$^2$ | 12 | 11 | 11 | 23 | 19 | 15 |
| Initial Gel, lb/100 ft$^2$ | 2 | 3 | 1 | 6 | 10 | 2 |
| 10 min. Gel, lb/100 ft$^2$ | 21 | 22 | 2 | 20 | 26 | 3 |
| pH | 10.7 | 10.6 | 10.9 | 10.8 | 10.2 | 10.5 |
| API Filtrate, cc | 16.9 | 10.2 | — | 16 | 12.9 | — |
| Activity | 0.82 | 0.76 | 0.79 | 0.81 | 0.78 | 0.80 |

EXAMPLE 4

Two drilling fluids were prepared in fresh water containing 1 ppb (2.85 kg/m$^3$) xanthan gum, 2.5 ppb (7.1 kg/m$^3$) crosslinked carboxymethyl starch, 1 ppb (2.85 kg/m$^3$) pre-gelatinized potato starch, and either 53% of methyl glucoside, based on the weight of the liquid phase, or 44% methyl glucoside, based on the weight of the liquid phase, respectively. These concentrations of methyl glucoside produced drilling fluids having aqueous activities of 0.84 and 0.88 respectively. The drilling fluids also contained 20 lb/bbl (57 kg/m$^3$) of Pierre shale to simulate drilled solids and were weighted to 12 lb/gal (1440 kg/m$^3$) with barite.

These drilling fluids were used to drill in the laboratory an Oligocene shale obtained from the Danish sector of the North Sea. This is a very reactive shale containing about 26% smectite by weight and having a cation exchange capacity of about 30 milliequivalents per 100 grams and an aqueous activity of 0.92. The Downhole Simulation Cell (DSC) discussed in the following references was used to drill the shale and evaluate the effects of these drilling fluids on this shale: (1) Simpson, J. P., Dearing, H. L., and Salisbury, D. P., "Downhole Simulation Cell Shows Unexpected Effects of Shale Hydration on Borehole Wall," SPE Drilling Engineering (March 1989), 24–30; (2) Salisbury, D. P., Ramos, G. G., and Wilton, B. S., "Wellbore Instability of Shales Using a Downhole Simulation Test Cell," 32nd U.S. Symposium on Rock Mechanics, Norman, Okla., July 10–12, 1991.

Each of the drilling fluids were tested using the DSC to subject the shale specimen to the temperature and pressures estimated for the in-situ shale. The test conditions were as follows: Overburden Pressure=5140 psi; Confining Pressure=4200 psi; Pore Pressure=3700 psi; Drilling Fluid Pressure=4100 psi; Annular Viscosity=52 ft/min.; Annular Shear=502 1/sec; Temperature=150° F.; Bit=1.25 inch, 2 cone, milltooth; Shale Specimen, Outside Diameter=5.25 inch, Length=6 inch.

The shale was drilled at a controlled rate to avoid mechanical damage. Mud was then circulated through the annulus between the drill pipe and borehole surface for 72 hours while measuring liquid drained or pumped in at the periphery of the shale. At the end of the test, pressures and temperature were reduced to ambient conditions. The shale specimen was immediately cut vertically using a dry-cut diamond saw. Durometer penetrometer hardness measurements were than made at increments of 0.25, 1 and 2 inches away from the borehole surface. Samples of the shale were taken from the same locations for testing. Moisture contents were measured by oven drying overnight at 200° F. An electrohygrometer was used to measure aqueous-phase activities following procedures given in API RP 13B-2. The data obtained are given in Table 4.

Discussion of Results—I. Drilling fluid with aqueous activity of 0.84. There was no build-up of shale pore pressure and there was no flux of water into the shale other than a probable initial wetting of the exposed pore surfaces. There was a substantial reduction in moisture content near the borehole surface and perhaps a slight reduction one-inch back. Methyl glucoside probably displaced some water at the immediate borehole surface. There was a reduction in the activity and a substantial hardening of the shale near the borehole surface. Potassium had penetrated the shale near the borehole surface, but there was no significant change in exchangeable bases of the shale one inch away from the borehole. Visual observation showed the borehole to be gauge and in excellent condition, with teeth marks still apparent. Overall, the effects of the methyl glucoside water-base fluid on the shale were remarkably similar to those of an oil-base mud having the same activity. The methyl glucoside appears to have become fixed in the near-borehole surface of the shale, establishing an effective semipermeable membrane which allowed water to move from the shale to the fluid under a chemical potential that exceeded the hydraulic potential of 400 psi tending to force water into the shale. II. Drilling fluid with aqueous activity of 0.88. The fluid activity required to balance the total aqueous potential created by a 400 psi hydraulic differential and a shale activity of 0.92 should be about 0.88 if a near-perfect semipermeable membrane is established. The DSC test indicates that a methyl glucoside mud with 0.88 activity established the desired membrane and provided borehole stability. There was no shale pore pressure build-up and only a minute quantity of water was extracted from the shale. The data indicate that methyl glucoside replaced some water in the shale near the borehole surface, with a corresponding reduction in moisture and activity and a slight decrease in hardness. The borehole was gauge with teeth marks of the bit still visible.

TABLE 4

Effect of Methyl Glucoside Drilling Fluids on a Reactive Shale in the Downhole Simulation Cell

| Shale Characteristics | Aqueous Activity = 0.84 Distance from Borehole Surface, inch | | | Aqueous Activity = 0.88 Distance from Borehole Surface, inch | | |
| --- | --- | --- | --- | --- | --- | --- |
|  | 0.25 | 1.0 | 2.0 | 0.25 | 1.0 | 2.0 |
| % Moisture | 11.0 | 13.8 | 14.7 | 14.7 | 16.5 | 16.7 |
| Aqueous Activity | 0.87 | 0.90 | 0.91 | 0.88 | 0.89 | 0.91 |
| Penetrometer Hardness | 62 | 58 | 58 | 55 | 58 | 58 |
| Exchangeable Bases | | | | | | |
| Potassium, meq/100 g | 6.8 | 2.2 | 1.2 | | | |
| Magnesium, meq/100 g | 2.7 | 3.0 | 3.1 | | | |
| Sodium, meq/100 g | 13.0 | 15.5 | 15.1 | | | |
| Calcium, meq/100 g | 12.9 | 14.5 | 14.8 | | | |

What is claimed is:

1. A method of increasing the yield point or gel strength of an aqueous base drilling fluid having incorporated therein one or more functional materials selected from the group consisting of weighting agents and fluid loss reducing additives which comprises adding to the drilling fluid at least 3% by weight of a water soluble alkyl glucoside, wherein said alkyl radical contains from one to four carbon atoms.

2. The method of claim 1 wherein the alkyl glycoside is methyl glucoside.

3. The method of claim 1 wherein the water soluble alkyl glycoside has the empirical formula $$C_6OH_7(OZ)_4(OC_6OH_7(OZ)_3)_nOR$$

where n=0–4, R=$C_1$–$C_4$ alkyl, and where each Z is independently selected from the group consisting of H, $CH_3$, $(CH_2CH_2O)_aH$, and $(CH_2CH(CH_3)O)_bH$, a=1–20, b=1–15.

4. A method of decreasing the fluid loss of an aqueous base drilling fluid having incorporated therein one or more functional materials selected from the group consisting of weighting agents and fluid loss reducing additives which comprises adding to the drilling fluid at least 5% by weight of a water soluble glycoside, wherein said alkyl radical contains from one to four carbon atoms.

5. The method of claim 4 wherein the alkyl glycoside is methyl glucoside.

6. The method of claim 2 wherein the water soluble alkyl glycoside has the empirical formula $$C_6OH_7(OZ)_4(OC_6OH_7(OZ)_3)_nOR$$

where n=0–4, R=$C_1$–$C_4$ alkyl, and where each Z is independently selected from the group consisting of H, $CH_3$, $(CH_2CH_2O)_aH$, and $(CH_2CH(CH_3)O)_bH$, a=1–20, b=1–15.

7. A method of decreasing the coefficient of friction of an aqueous based drilling fluid having incorporated therein one or more functional materials selected from the group consisting of weighting agents and fluid loss reducing additives which comprises adding to the drilling fluid at least 15 % by weight of a water soluble alkyl glycoside, wherein said alkyl radical contains from one to four carbon atoms.

8. The method of claim 7 wherein the alkyl glycoside is methyl glucoside.

9. The method of claim 3 wherein water soluble alkyl glycoside has the empirical formula $$C_6OH_7(OZ)_4(OC_6OH_7(OZ)_3)_nOR$$

where n=0–4, R=$C_1$–$C_4$ alkyl, and where each Z is independently selected from the group consisting of H, $CH_3$, $(CH_2CH_2O)_aH$, and $(CH_2CH(CH_3)O)_bH$, a=1–20, b=1–15.

10. A method of decreasing the swelling of shales contacted by an aqueous based drilling fluid having incorporated therein one or more functional materials selected from the group consisting of weighting agents and fluid loss reducing additives, and the fluid containing an aqueous phase, which comprises adding to the drilling fluid at least 35% by weight of the aqueous phase of said aqueous based drilling fluid of a water soluble alkyl glycoside, wherein said alkyl radical contains from one to four carbon atoms.

11. The method of claim 10 wherein the water soluble alkyl glycoside has the empirical formula $$C_6OH_7(OZ)_4(OC_6OH_7(OZ)_3)_nOR$$

where n=0–4, R=$C_1$–$C_4$ alkyl, and where each Z is independently selected from the group consisting of H, $CH_3$, $(CH_2CH_2O)_aH$, and $(CH_2CH(CH_3)O)_bH$, a=1–20, b=1–15.

12. A method of reducing the aqueous activity of an aqueous base drilling fluid having incorporated therein one or more functional materials selected from the group consisting of weighting agents and fluid loss reducing additives, which comprises adding to the drilling fluid a concentration of at least about 35% by weight of the aqueous phase of said aqueous based drilling fluid of a water soluble alkyl glycoside, wherein said alkyl radical contains from one to four carbon atoms.

13. The method of claim 12 wherein the water soluble alkyl glycoside has the empirical formula $$C_6OH_7(OZ)_4(OC_6OH_7(OZ)_3)_nOR$$

where n=0–4, R=$C_1$–$C_4$ alkyl, and where each Z is independently selected from the group consisting of H, $CH_3$, $(CH_2CH_2O)_aH$, and $(CH_2CH(CH_3)O)_bH$, a=1–20, b=1–15.

14. In a drilling process wherein an aqueous base drilling fluid having incorporated therein one or more functional materials selected from the group consisting of weighting agents and fluid loss reducing additives is circulated within the borehole and wherein it is desired to either (a) increase the gel strength or yield point of the drilling fluid, (b) decrease the fluid loss of the drilling fluid, (c) decrease the coefficient of friction of the drilling fluid, or (d) decrease the aqueous activity of the drilling fluid and thus decrease the swelling of shales contacted by the drilling fluid, the improvement which comprises adding to the drilling fluid a water soluble alkyl glucoside, wherein said alkyl radical contains from one to four carbon atoms, wherein the amount of alkyl glycoside added to the drilling fluid to increase the yield point or gel strength of the drilling fluid is at least 3% by weight of the drilling fluid, wherein the amount of alkyl glycoside added to the drilling fluid to decrease the fluid loss of the drilling fluid is at least 5% by weight of the drilling fluid, wherein the amount of alkyl glycoside added to the drilling fluid to decrease the coefficient of friction of the drilling fluid is at least 15 % by weight of the drilling fluid, and where the amount of alkyl glycoside added to the aqueous phase of the drilling fluid to decrease the swelling of shales contacted by the drilling fluid is at least 35% by weight of the aqueous phase of the drilling fluid.

15. The fluid of claim 14 wherein the alkyl glycoside is methyl glucoside and wherein the amount of methyl glucoside is at least about 3% by weight of the drilling fluid.

16. A method of decreasing the swelling of shales contacted by an aqueous based drilling fluid having incorporated therein one or more functional materials selected from the group consisting of weighting agents and fluid loss reducing additives, and the fluid containing an aqueous phase, which comprises incorporating in the aqueous phase of the drilling fluid a concentration of a water soluble alkyl glycoside and at least one water soluble alkali or alkaline earth metal salt in amounts sufficient to decrease the activity of the aqueous phase, wherein the alkyl group contains from one to four carbon atoms.

17. The method of claim 16 wherein the alkyl glycoside is methyl glucoside.

18. The method of claim 16 wherein the water soluble alkyl glycoside has the empirical formula $$C_6OH_7(OZ)_4(OC_6OH_7(OZ)_3)_nOR$$

where n=0–4, R=$C_1$–$C_4$ alkyl, and where each Z is independently selected from the group consisting of H, $CH_3$, $(CH_2CH_2O)_aH$, and $(CH_2CH(CH_3)O)_bH$, a=1–20, b=1–15.

19. A method of reducing the aqueous activity of an aqueous based drilling fluid having incorporated therein one or more functional materials selected from the group consisting of weighting agents and fluid loss reducing additives, which comprises adding to the fluid a water soluble alkyl glycoside and at least one water soluble alkali or alkaline earth metal salt in amounts sufficient to reduce the aqueous activity of the fluid, wherein the alkyl group of said alkyl glycoside contains from one to four carbon atoms.

20. The method of claim 19 wherein the alkyl glycoside is methyl glucoside.

21. The method of claim 13 wherein the water soluble alkyl glycoside has the empirical formula $$C_6OH_7(OZ)_4(OC_6OH_7(OZ)_3)_nOR$$

where $n=0-4$, $R=C_1-C_4$ alkyl, and where each Z is independently selected from the group consisting of H, $CH_3$, $(CH_2CH_2O)_aH$, and $(CH_2CH(CH_3)O)_bH$, $a=1-20$, $b=1-15$.

22. An aqueous base drilling fluid having incorporated therein one or more functional materials selected from the group consisting of weighting agents and fluid loss reducing additives containing from about 3% to about 35% by weight of the aqueous phase of a water soluble alkyl glycoside, wherein said alkyl radical of said alkyl glycoside contains from one to four carbon atoms, and wherein the water soluble alkyl glycoside has the empirical formula $$C_6OH_7(OZ)_4(OC_6OH_7(OZ)_3)_nOR$$

where $n=0-4$, $R=C_1-C_4$ alkyl, and where each Z is independently selected from the group consisting of H, $CH_3$, $(CH_2CH_2O)_aH$, and $(CH_2CH(CH_3)O)_bH$, $a=1-20$, $b=1-15$.

23. The fluid of claim 22 wherein the alkyl glycoside is methyl glucoside and wherein the amount methyl glucoside is at least about 5% by weight of the drilling fluid.

24. The fluid of claim 22 wherein the alkyl glycoside is methyl glucoside and wherein the amount methyl glucoside is at least about 15% by weight of the drilling fluid.

25. In a fluid selected from the group consisting of drilling fluids, completion fluids, workover fluids, and well working fluids, the fluid having incorporated therein one or more functional materials selected from the group consisting of weighting agents and fluid loss reducing additives, and the fluid containing an aqueous phase, the improvement which comprises solubilizing in the aqueous phase at least 35% by weight of an alkyl glycoside, wherein said alkyl radical of said alkyl glycoside contains from one to four carbon atoms, and wherein the water soluble alkyl glycoside has the empirical formula $$C_6OH_7(OZ)_4(OC_6OH_7(OZ)_3)_nOR$$

where $n=0-4$, $R=C_1-C_4$ and where each Z is independently selected from the group consisting of H, $CH_3$, $(CH_2CH_2O)_aH$, and $(CH_2CH(CH_3)O)_bH$, $a=1-20$, $b=1-15$.

26. An aqueous based drilling fluid having incorporated therein one or more functional materials selected form the group consisting of weighting agents and fluid loss reducing additives containing a water soluble alkyl glycoside in an amount which is sufficient to either (a) increase the yield point strength for the drilling fluid, (b) decrease the fluid loss of the drilling fluid, (c) decrease the coefficient of friction of the drilling fluid, or (d) decrease the aqueous activity of the drilling fluid, wherein the amount of alkyl glycoside added to the drilling fluid to increase the yield point or gel strength is at least 3% by weight of the drilling fluid, where the amount of alkyl glycoside added to the drilling fluid to decrease the fluid loss of the drilling fluid is at least 5% by weight of the drilling fluid, wherein the amount of alkyl glycoside added to the drilling to decrease the coefficient of friction of the drilling fluid is at least 15% by weight of the drilling fluid, and wherein the amount of alkyl glycoside added to the drilling fluid to decrease the swelling of shales contacted by the drilling fluid is at least 35% by weight of the liquid phase of the drilling fluid.

* * * * *